E. G. CHORMANN.
Stereoscopic Instrument.
No. 38,196. Patented April 14, 1863.
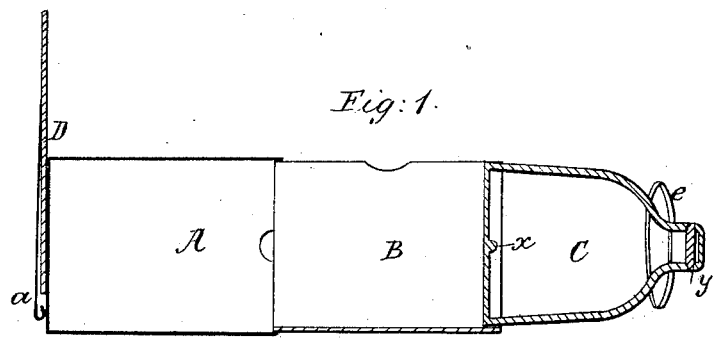
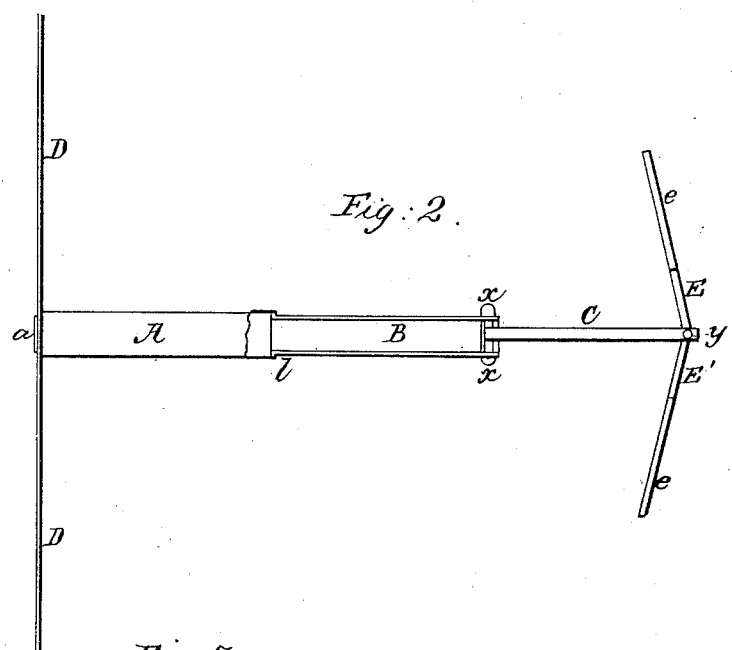
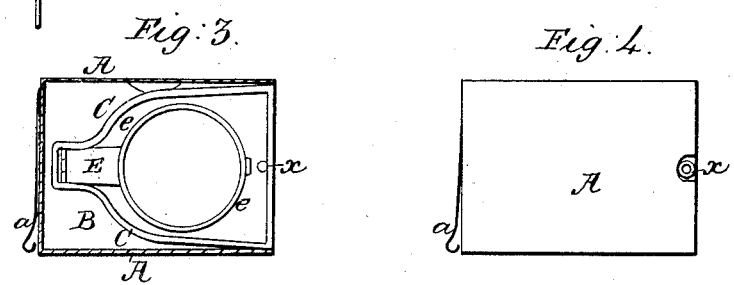

UNITED STATES PATENT OFFICE.

ERNEST G. CHORMANN, OF PHILADELPHIA, PENNSYLVANIA, ASSIGNOR TO HIMSELF AND THOMAS COCHRANE, ASSIGNORS TO ERNEST G. CHORMANN, OF SAME PLACE.

STEREOSCOPIC INSTRUMENT.

Specification forming part of Letters Patent No. 38,196, dated April 14, 1863.

*To all whom it may concern:*

Be it known that I, ERNEST G. CHORMANN, of Philadelphia, Pennsylvania, have invented an Improved Stereoscopic Instrument; and I do hereby declare the following to be a full, clear, and exact description of the same, reference being had to the accompanying drawings, and to the letters of reference marked thereon.

My invention consists of the peculiar construction and arrangement, fully described hereinafter, of parts composing a stereoscopic instrument, the said parts being so adjustable and so arranged for expansion as to form a complete instrument for viewing stereoscopic pictures, and yet admitting of being contracted or folded into a very small compass when not required for use.

In order to enable others skilled in the construction of this class of instruments to make and use my invention, I will now proceed to describe the manner of constructing and using the same.

On reference to the accompanying drawings, which form a part of this specification, Figure 1 is a sectional elevation of my improved stereoscopic instrument as it appears when extended and in a position for viewing the picture; Fig. 2, a plan view of Fig. 1, partly in section; Fig. 3, a sectional view of the instrument as it appears when closed, and Fig. 4 an exterior view of Fig. 3.

Similar letters refer to similar parts throughout the several views.

My improved stereoscopic instrument consists of the outer box or casing, A, the inner casing, B, and the frame C, to which are hinged the two arms E and E', each arm being provided with a ring, $e$, containing an appropriate lens. At the closed end of the outer box, A, is secured a spring, $a$, between which and the end of the box is confined the stereoscopic picture D. The opposite end of the box A is open for the reception of the inner casing, B, which fits accurately, but so as to slide freely in the said outer box. The inner casing is prevented from being withdrawn entirely from the outer box by flanges or lips $b$, as best observed on reference to Fig. 2.

The frame C consists of a bent rod or wire, the form of which is shown in Fig. 1, the frame being hinged at $x$ to the inner casing, B, so that it can be turned up in the direction of the arrow and down into the said inner casing.

To a pin or rivet, $y$, passing through and secured to the outer end of the frame C, are hinged the arms E and E', each of which, as before remarked, has a ring, $e$, provided with an appropriate lens.

As seen in Figs. 1 and 2, the instrument is arranged for viewing the picture D, the exterior casing, A, being held between the finger and thumb in such a manner as not to obstruct the view, while the end of the frame C is pressed lightly against the nose in such a position that the eyes shall be opposite to the lenses carried by the arms E and E'. If the distance between the lenses and the picture should be too great in the first instance, a ready adjustment of the instrument can be obtained by pressing the end of the frame C against the bridge of the nose, and thereby causing the casing B to slide into the box A until the desired focus is obtained. As the arms E and E' are capable of being moved on the pin $y$, the lenses can be readily adjusted to any angle which may be found most convenient for obtaining the desired view of the picture.

When the instrument is not required for further use, the picture D is removed, after which the arms are turned on the pin $y$, so that the rings $e$ $e$ may meet each other, the form of the frame C being such as to permit this meeting of the rings.

The frame, with its arms, rings, and lenses, is then turned up in the direction of the arrow, Fig. 1, and down into the casing B, which is sufficiently large to admit the whole, the casing, with its contents, is then pushed into the outer box, A, so that the instrument will assume the form represented in Figs. 3 and 4, a form so compact and of such limited dimensions as to be contained in the vest-pocket without inconvenience to the wearer.

In order to facilitate the extension of the instrument when it is required for use, the pin $x$ is formed into two projecting knobs, which take their places in notches formed in the end of the box A, when the instrument is closed, as seen in Fig. 4, and which serve as appropriate mediums for withdrawing the casing B from the box by means of the finger and thumb.

The upper end of the casing B is notched, so that the frame C, with its arms and lenses, can be readily seized by the nails of the finger and thumb, and thereby turned outward from the casing.

The box A may be made of metal and plated or otherwise ornamented; or it may be made of other material and ornamented in the same manner as ordinary card-cases.

I claim as my invention and desire to secure by Letters Patent—

1. The frame C, having lenses adjustable in the manner described, or any equivalent to the same, and the casing B, in combination with the box A, or its equivalent, the whole being constructed and arranged substantially as and for the purpose herein set forth.

2. The arms E and E', with their rings and lenses, when hung to the frame C, and arranged for ready adjustment, and for folding together, substantially as set forth, for the purpose specified.

3. The spring $a$, when combined with the box A, casing B, and frame C, as set forth.

In testimony whereof I have signed my name to this specification in the presence of two subscribing witnesses.

E. G. CHORMANN.

Witnesses:
HENRY HOWSON,
JOHN WHITE.